Nov. 20, 1956   G. M. LASSERRE ET AL   2,771,144
BLADES FOR ROTARY-WING AIRCRAFT
Filed Oct. 28, 1952   3 Sheets-Sheet 1

Nov. 20, 1956  G. M. LASSERRE ET AL  2,771,144
BLADES FOR ROTARY-WING AIRCRAFT
Filed Oct. 28, 1952  3 Sheets-Sheet 2
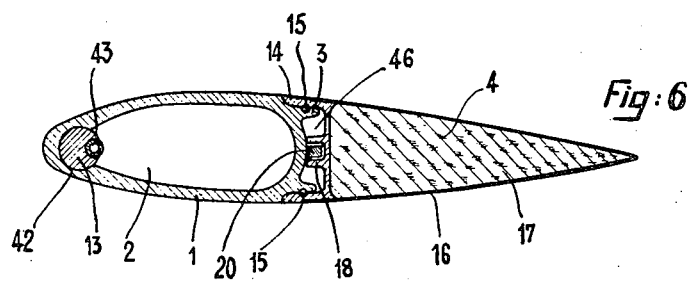
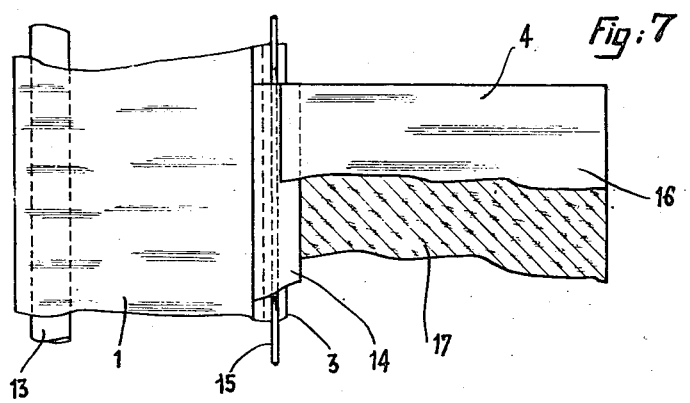
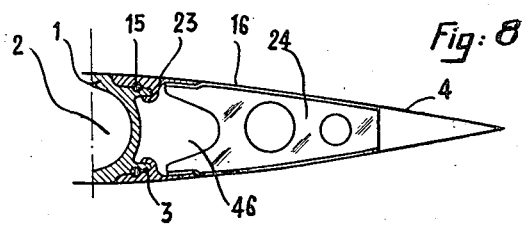
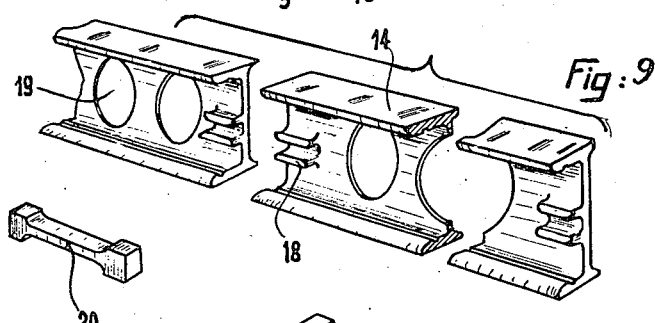

Nov. 20, 1956   G. M. LASSERRE ET AL   2,771,144
BLADES FOR ROTARY-WING AIRCRAFT
Filed Oct. 28, 1952   3 Sheets-Sheet 3
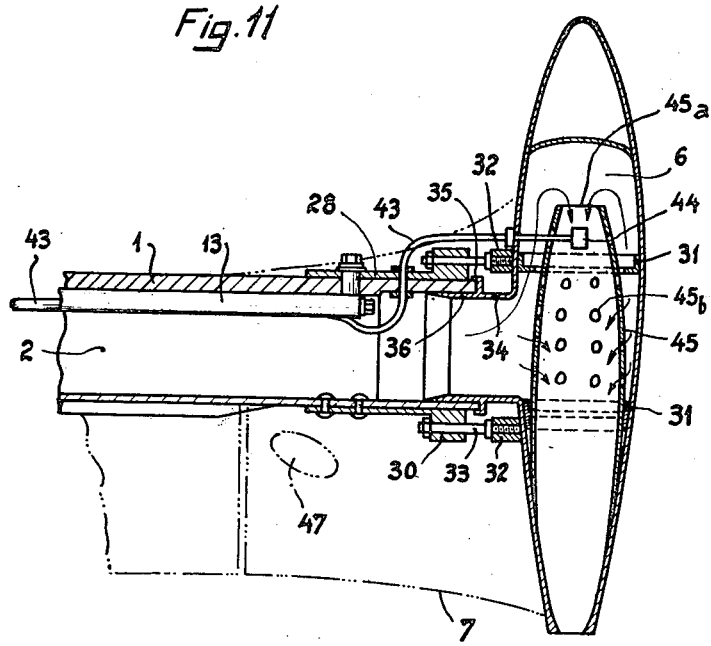
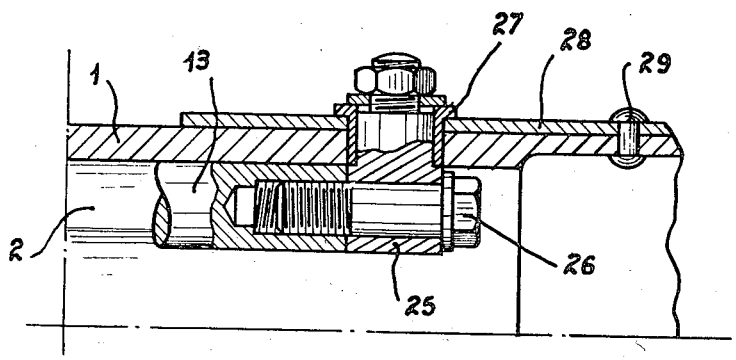

United States Patent Office 2,771,144
Patented Nov. 20, 1956

2,771,144

BLADES FOR ROTARY-WING AIRCRAFT

Gaston M. Lasserre, Boulogne-sur-Seine, André H. Laville, Pontoise, and Paul H. L. Morain, Paris, France, assignors to Societe Nationale de Constructions Aeronautiques du Sud-Ouest (Societe Anonyme), Paris, France, a company of France Application October 28, 1952, Serial No. 317,306

Claims priority, application France December 28, 1951

3 Claims. (Cl. 170—159)

This invention relates to propeller blades, and more particularly to blades for rotary-wing aircraft, comprising a stressed metal spar defining the leading edge of the blade and a trailing edge structure attached to said spar over at least an outer portion of the length of the latter and completing the airfoil contour of the blade.

Conventional trailing edge structure is usually assembled to the spar by means such as rivets or bolts liable to localize high concentrated stresses on the spar, which are detrimental to strength. Where an adhesive bond is used for such assembly instead of rivets or bolts, a limit is imposed on the permissible temperature of the fluid, heating fluid or fuel, circulated through the blade. Moreover, all such types of assembly are permanent and do not admit of removal of the trailing edge structure for inspection and repair of the spar.

An object of the invention is to provide a rotary wing blade assembly of the type specified including an improved connecting arrangement between the spar defining the leading edge of the blade and the casing defining the trailing edge thereof, which connection is simple, strong and readily separable, and is not influenced by the temperature of any heated fluid which may be circulated through the spar.

A further object is to provide a rotary wing blade assembly and specifically a tubular spar therefor, which is provided with an improved balancing arrangement.

A further object is to provide such a blade structure and spar, in which especial provision is made for the circulation of one or more fluids therethrough.

A further object is to provide in a blade assembly for a rotary wing of the type specified, an improved multi-sectional trailing edge structure whereby centrifugal and other stresses acting thereon in service will be transmitted directly to the hub of the rotary wing without being substantially transferred to the spar.

The above and further objects of the invention, as well as the characteristic features thereof, will appear as the disclosure proceeds, with reference to the accompanying diagrammatic drawings, which illustrate by way of example but without any limitation, of preferred forms of embodiment of the improvements according to the invention.

Figs. 6 and 7 are a cross sectional and a plan view, respectively, of an intermediate portion of the blade shown in Fig. 5;

Fig. 8 shows in cross section a modified construction of the trailing edge structure;

Fig. 9 is a perspective fragmentary and exploded view illustrating the interconnection between elements of the trailing edge structure and between the innermost element and the blade root;

Fig. 10 illustrates the attachment of a balancing weight at the tip of the blade; and Fig. 11 shows the attachment of a jet propulsion unit to the tip of the blade.

Figure 1:
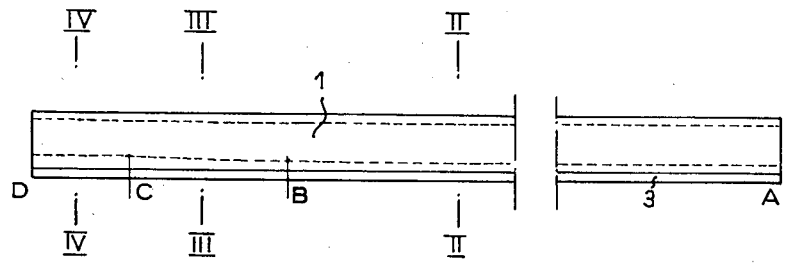
Fig. 1 illustrates in elevation an extruded blank for a tubular spar.
Figure 2:
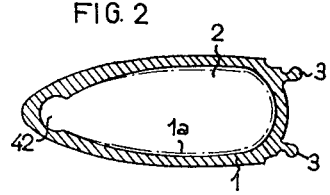
Fig. 2 is a cross section of the spar.
Figure 3:
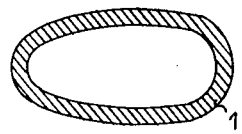
Figs. 3 and 4 are sections, on lines III—III and IV—IV respectively, of the extruded blank after a forging operation.
Figure 4:
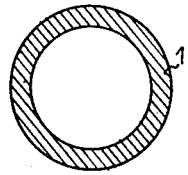

Referring to the drawings, the blade assembly comprises a tubular metal spar member 1 defining the airfoil contour of the leading portion of the blade, and a trailing structure removably attached to said leading portion. The spar member 1 may be conveniently produced from a substantially straight tubular blank (Fig. 1) and formed, for example, by an extrusion process to present a substantially oval or elliptical cross section throughout its whole length (Fig. 2), said section defining a passage or channel 2. A major length portion A—B of the spar member is formed, at its aft side, with rearwardly directed, spanwise extending, parallel ribs 3 for supporting the trailing structure, this major length portion A—B being continued by a minor length portion B—C of progressively increasing wall thickness the internal contour of which is indicated in dotted lines at 1a in Fig. 2. This minor length portion is deformed, for example, by a forging operation so that the original oval cross section shown in Fig. 2 changes gradually to a circular cross section (Figs. 3 and 4) to terminate in a cylindrical end portion C—D defining the blade root which may then be machined to provide any conventional anchoring means for mounting the finished spar member 1 to a cooperating hub structure.

Figure 5:
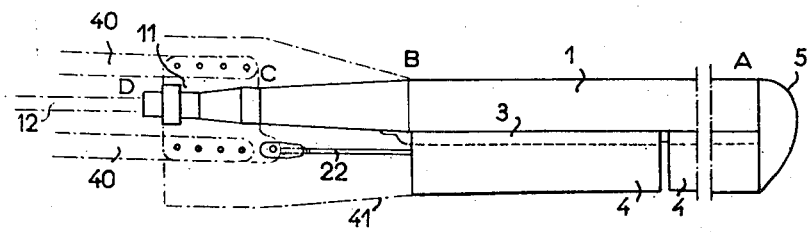
Fig. 5 is a general diagrammatic view of the blade assembly comprising a finished spar member.

Fig. 5 illustrates schematically a complete blade which comprises, in addition to the tubular spar member 1, a removable trailing edge structure made of separate elements 4 secured to the ribs or tongues 3 of the spar, and an end fairing member 5.

Figs. 6 and 7 illustrate in detail the configuration of the improved blade assembly in an intermediate part thereof. Formed, for example, during an extrusion process in the thickened leading end of the spar contour is a groove 42 (also shown in Fig. 2) defined by a circular arc substantially greater than a half-circumference in extent. Inserted in this groove is a balancing weight element 13 serving to increase the weight of the leading edge portion of the blade in order to bring the centre of gravity of the blade section closed to the centre of torsion of the spar section. The weight element 13 may be inserted into the groove 42 by sliding it in from one end of the blade.

The weight element 13 may furthermore be used as an auxiliary conduit or a support for one or more auxiliary conduits in case more than one fluid are to be supplied through the tubular spar element as for instance in the case of jet-powered rotary-wing aircraft wherein fuel has to be conveyed to combustion chambers and jet nozzles provided at the tips of the blades.

Figs. 6 and 7 further illustrate the manner in which the spar is connected with the fairing elements 4 providing the trailing edge portions of the blade. Each of the ribs 3 has milled in the outer surface thereof a longitudinally extending groove adapted to receive a wire element 15 therein. A complementary groove is formed in each of the two flanges of a suitable profiled section 14 projecting from the forwardly directed end of the fairing element 4 which section is adapted to be fitted over the two ribs 3, with the complementary grooves thereof registering with the grooves in said ribs. The wires 15 inserted into the recesses defined by the registering pairs of grooves provide a keying device whereby the section 14 can be firmly yet separably assembled in position relative to the spar 1 wthout requiring perforations to be formed therein.

As shown in Figs. 6 and 7, the trailing edge fairing elements 4 are preferably provided in the form of V-bent sheet elements 16 and having their free ends suitably secured as by welding, adhesive attachment or riveting to the outer faces of the profiled element 14. Rigidity is imparted to the trailing edge fairing structure or casing 16 by a suitable stuffing 17 of any appropriate material having a low density and low moisutre absorbing capacity, such as a suitable cellular plastic or a synthetic resin base foam; the stuffing may be adhesively bonded to the internal surface of the casing elements 4. Alternatively or in addition thereto, as shown by way of example in Fig. 8, light transverse bulkheads or ribs 24 may be provided and suitably assembled to the sheet elements in any conventional way.

In order to minimize the strains which would be developed in the spar if the bending stresses from the entire length of the blade were to be exerted thereon, the trailing edge casing structure is subdivided into a number of sections 4 of moderate length (Fig. 5). A further advantage of this arrangement is to prevent any twisting stresses to which the blade may be subjected from being exerted on said structure. In other words, the elastic centre line of the blade is practically coincident with the elastic centre line of the spar owing to the weighting element 13 provided for balancing the weight of the trailing edge. Moreover, according to the invention, the aforementioned elements 4 of the trailing edge structure are not provided with any securing means such as rivets for fastening the same to the spar 1, which would be liable to transmit forces thereto. Such fastening means would result in imparting a non uniform shape to the transverse cross-section of the spar and would therefore result in dangerously high, locally concentrated strains therein. In order nevertheless to preclude the possibility of relative slippage of the elements 4 along the spar and to provide for the requisite transmission of centrifugal forces to the hub, the profiled section 14 in each element is formed adjacent each end and the midpoint thereof (see Fig. 9) with a pair of tenons 18 adapted to receive therebetween a key member 20 formed with end shoulder portions adapted to engage the remote outer end surfaces of the respective pairs of tenons in the two adjacent elements 14 (or the surfaces of suitable recesses formed in said tenons) for transmitting the centrifugal stresses from each element 14 to the next one. The last key member 21 of the series, adjacent to the root of the blade structure is provided, at the end thereof directed towards the hub, with suitable fastening means, such as the rod 22 adapted to transmit the combined centrifugal forces developed in all the elements of the blade to the cooperating hub structure.

As a result of the various features and arrangements described, the trailing edge assembly of the blade effectively cooperates with the leading edge structure to develop the desired lift, while at the same time the secondary strains resulting from said lift and from centrifugal force do not act upon the spar which remains capable of responding freely to such stresses. In other words, the trailing edge assembly is mechanically independent from the leading edge spar as concerns all such secondary stresses.

Fig. 10 illustrates in detail one example of the way in which the weighting element 13 may be fastened at the end of the spar 1. In this arrangement, the weighting element is compressed by centrifugal force, but is prevented from buckling owing to the fact that it is encased within its housing recess or groove 42. The outer end of the weight element 13 is abutted against a part 25 bolted to the wall of the spar 1. A screw 26 is provided for adjusting the abutting engagement and taking up any clearance that may tend to develop. A reinforcing ring 27 and a bushing 28 secured to the spar with rivets 29, further improve the connection between part 25 and spar 1. This connection being located at the end of the spar which is not subjected to considerable alternating strains, bolt and rivet holes may be used herein without any adverse effects.

Fig. 11 shows one example of a blade-tip jet motor secured to the end of spar 1. Secured to the tip of the spar by rivets or the like, is a bushing 28 formed with at least one, and preferably two pairs of bosses 30 formed with perforations parallel to the length of the spar. The jet unit assembled is provided with two reinforced sections 31 formed with internally screw-threaded bosses 32 receiving therein screw pins 33. The pins cooperate with the threaded bosses 30 in the bushing 28 for assembling the jet propulsion unit to the spar. Moreover, the supply tube 34 leading to the jet unit is dimensioned to fit snugly into the tubular spar 1. The tube 34 is provided with flange 35 adapted to engage tightly against the end of the spar when the screws 33 have been tightened, thus providing a tight seal at the joint 36.

In cases where the jet unit 6 does not merely consist of a jet nozzle, but actually constitutes a jet propulsion motor including a combustion chamber, the fuel supply tube 43 is extended as far as the center of said combustion chamber and terminates in a burner 44. The burner is surrounded with a perforate casing 45 through which combustion air is supplied from the channel 2 as indicated by the arrows to provide both the primary air through the open end 45a of the casing 45 and the secondary air through the perforations 45b.

A fair-shaped cover casing 7 surrounds the bosses and pins mentioned above to provide a streamlined overall contour. This fairing may be assembled in any suitable way preferably such as to enable ready access to the jet propulsion unit and dismantling thereof when required.

As already mentioned, in the case of rotary-wing craft in which the rotary wings are rotated by means other than jet nozzles at the blade tips, the jet units just described would of course be omitted and suitable end fairing structures would be mounted in place thereof in any suitable manner which may be similar to any of the connections already described.

Where the fluid flowing through the duct 2 is a hot gas, an air intake may be provided adjacent to the hub into the channel 46 (Fig. 6) defined between the rear wall of the spar and the profiled sections securing the trailing edge structure thereto, in order to provide for cooling said profiled sections and structure. The air forced through this channel by centrifugal force may be discharged through the openings 47 in the fairing 7 (Fig. 11).

It will be noted that one particularly desirable feature of the construction described is the absence of any perforations and of any attachment means in those areas of the spar subjected to the greatest strains, which if present would weaken the spar and would moreover develop high local stresses at the points of attachment.

It will be understood that the structural details described and illustrated are exemplary only, since many modifications may be made therein and the invention may be embodied in other forms than those specifically mentioned without exceeding the scope or departing from the spirit thereof.

What we claim is:

1. A propeller or sustaining rotor blade assembly for aircraft comprising a tubular metal spar member adapted to define a leading edge of the blade and having longitudinally extending first means projecting therefrom towards the rear edge of the blade, a trailing edge structure adapted to complete the airfoil contour of the blade and consisting of a plurality of separate elements, a profiled section attached to the leading side of each of said elements and having second longitudinally extending means projecting therefrom into cooperative relationship with said first means, keying means associated with said element for retaining said elements assembled to said spar while allowing limited independent sliding displacement of each element relative to the spar and to the adjacent elements, and separate traction-resisting displacement-limiting means interconnecting said profiled sections of adjacent elements and connecting the profiled section of the innermost one of said elements to said hub.

2. A blade assembly as claimed in claim 1, wherein said traction-resisting means comprise two-headed parts each adapted to have the opposite heads thereof lockingly engage with complementary means formed on said profiled sections.

3. A blade assembly according to claim 1 in which a part-cylindrical housing having an arcuate extent somewhat greater than a semi-circumference is formed internally of said tubular spar longitudinally thereof and adjacent the forward end of its cross-section, an elongated cylindrical rodlike member being inserted into said housing to serve as a balancing weight, and securing means being provided at the outermost end of said rodlike member for preventing axial displacement thereof.

References Cited in the file of this patent

UNITED STATES PATENTS

| | | |
|---|---|---|
| 1,839,919 | Hall | Jan. 5, 1932 |
| 1,869,478 | Heath | Aug. 2, 1932 |
| 1,950,080 | Cierva | Mar. 6, 1934 |
| 2,056,592 | Siddeley et al. | Oct. 6, 1936 |
| 2,152,861 | Bennett | Apr. 4, 1939 |
| 2,183,158 | Bennett | Dec. 12, 1939 |
| 2,272,439 | Stanley et al. | Feb. 10, 1942 |
| 2,354,198 | Chubb | July 25, 1944 |
| 2,456,485 | Bendix | Dec. 14, 1948 |
| 2,485,534 | Mayne et al. | Oct. 18, 1949 |
| 2,593,335 | Neale | Apr. 15, 1952 |
| 2,606,728 | Sikorsky | Aug. 12, 1952 |
| 2,609,883 | Daland | Sept. 9, 1952 |
| 2,620,884 | Gluhareff | Dec. 9, 1952 |
| 2,631,676 | Hiller | Mar. 17, 1953 |
| 2,658,265 | Brauchler et al. | Nov. 10, 1953 |
| 2,693,922 | Ellison et al. | Nov. 9, 1954 |

FOREIGN PATENTS

| | | |
|---|---|---|
| 546,176 | Great Britain | July 1, 1942 |
| 597,721 | Great Britain | Feb. 2, 1948 |
| 637,827 | Great Britain | May 24, 1950 |
| 644,478 | Great Britain | Oct. 11, 1950 |